United States Patent [19]

Wainwright

[11] Patent Number: 4,713,943
[45] Date of Patent: Dec. 22, 1987

[54] EVAPORATIVE COOLER INCLUDING AN AIR-TO-AIR COUNTER-FLOW HEAT EXCHANGER HAVING A REVERSE TEMPERATURE PROFILE

[76] Inventor: Christopher E. Wainwright, 1246 W. Kiowa Cir., Mesa, Ariz. 85202

[21] Appl. No.: 778,412

[22] Filed: Sep. 20, 1985

Related U.S. Application Data

[63] Continuation-in-part of Ser. No. 550,711, Nov. 9, 1983, abandoned, which is a continuation of Ser. No. 305,397, Sep. 25, 1981, abandoned.

[51] Int. Cl.⁴ .............................................. F28D 5/00
[52] U.S. Cl. .................................... 62/304; 165/170; 261/160
[58] Field of Search .................. 62/304, 309, 310, 171, 62/172; 261/161, 112, 160, 158; 165/60, 172, 175, 170

[56] References Cited

U.S. PATENT DOCUMENTS 4,188,994 2/1980 Hishaw ................................. 62/304

Primary Examiner—Henry A. Bennett
Attorney, Agent, or Firm—Charles P. Padgett, Jr.

[57] ABSTRACT

An evaporative cooler air conditioning system comprising an air-to-air counter-flow heat exchanger having separate dry cooling and wet evaporating chambers, air saturating elements, and air movement devices. Ambient supply air or other fluid is forced through the dry cooling chamber of the heat exchanger and exits, after transferring through the heat exchanger, into the cooled spaced or room to be cooled. The air in the cooled space absorbs heat from the heat load and reaches an equilibrium at a warmer temperature, and is then forced directly through the wet evaporative chamber of the heat exchanger where it is heavily saturated with water or other liquid. As the air or other fluid passes through the wet evaporating enclosure a reverse temperature profile results and heat is drawn from the supply air fluid on the dry side through the heat exchanger to evaporate the water or other liquid; it results in the cooling of the supply air or other fluid exiting the dry side of the heat exchanger to a temperature that can be significantly below its wet-bulb temperature and approaching to its dew point temperature.

22 Claims, 9 Drawing Figures

FIG. 1

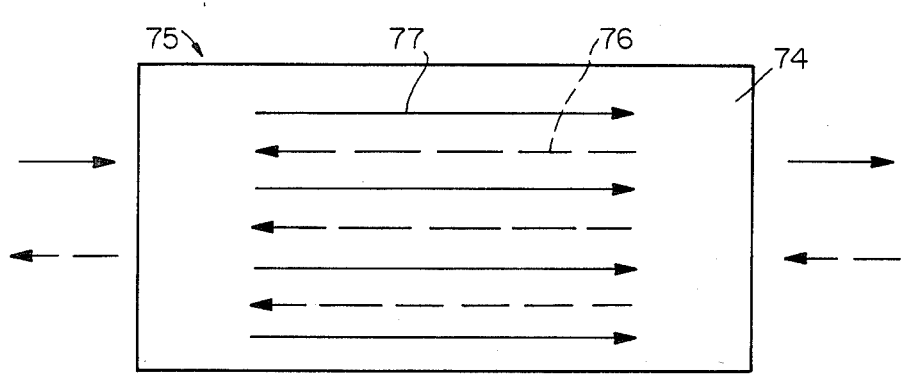
FIG. 4
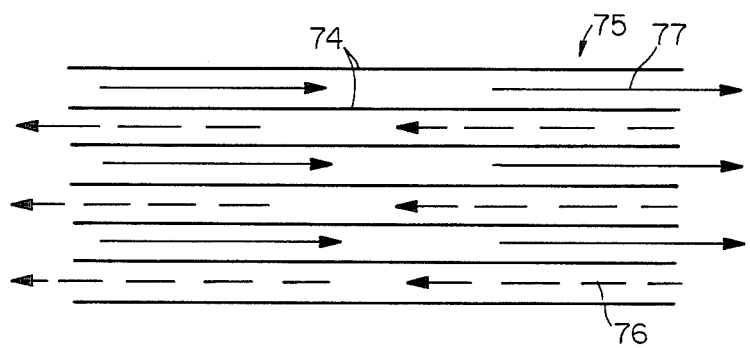
FIG. 5
FIG. 6
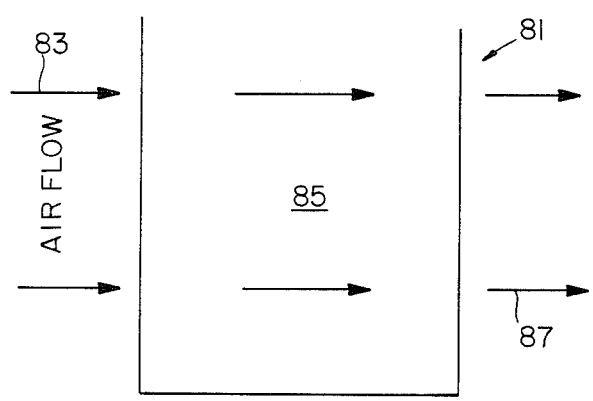
FIG. 8
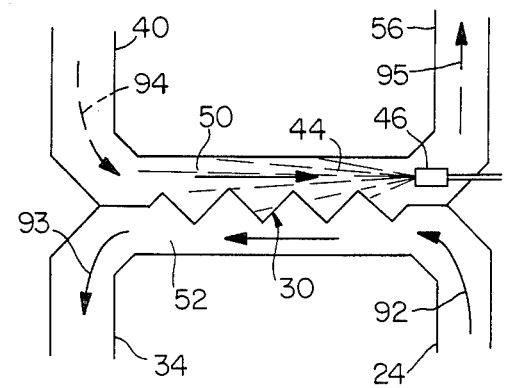
FIG. 7
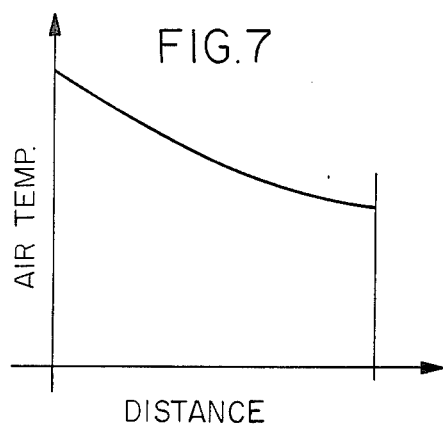
FIG. 9
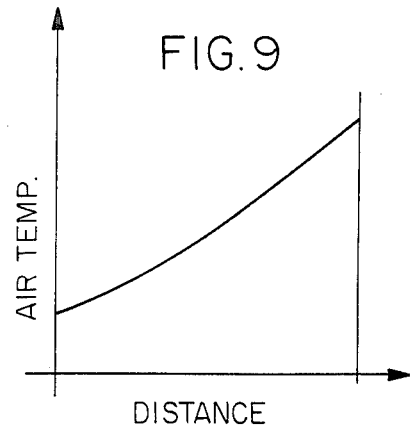

EVAPORATIVE COOLER INCLUDING AN AIR-TO-AIR COUNTER-FLOW HEAT EXCHANGER HAVING A REVERSE TEMPERATURE PROFILE

This Application Ser. No. 778,412, filed Sept. 20, 1985 by Christopher E. Wainwright for an IMPROVED EVAPORATIVE COOLER INCLUDING AN AIR-TO-AIR COUNTER-FLOW HEAT EXCHANGER HAVING A REVERSE TEMPERATURE PROFILE is a Continuation-In-Part of Application Ser. No. 550,711, filed 11-9-83, now abandoned, by Christopher E. Wainwright for an IMPROVED EVAPORATIVE COOLER, which in turn, is a Continuation of Application Ser. No. 305,397, filed 9-25-81, by Christopher E. Wainwright for an IMPROVED EVAPORATIVE COOLER, now abandoned, and is entitled to the filing date thereof.

BACKGROUND OF THE INVENTION

1. Field of the Invention

This invention relates generally to evaporative coolers and more specifically to an evaporative cooler air conditioning system; wherein an ambient airstream is cooled, sensibly, by means of a counter-flow heat exchanger such that evaporation continues within the heat exchanger in an exhausting airstream during the heat exchange process so that the temperature of the cooled air can be well below the wet-bulb temperature and even to a temperature close to the dew point temperature of the ambient air.

2. Description of the Prior Art

The concept of using evaporative cooler systems to provide an efficient method of cooling air for the purpose of cooling homes, apartments, industrial buildings, commercial buildings, house trailers and other enclosures, is old and well-established in the art.

In the past, there have been disclosed in the prior art many different apparatus and methods of using the cooling effect of the evaporation of water to lower the temperature of an airstream. Conventional evaporative coolers, cool air at a constant enthalpy; that is, the air is cooled by the evaporation of water without the addition or subtraction of heat. As a result, the minimum theoretical temperature which could be reached or to which a conventional evaporative cooler can cool the incoming air, is the wet-bulb temperature of its initial state.

In U.S. Pat. No. 1,985,529, to Ray; a process was disclosed whereby the temperature of the air circulated in an evaporate cooler air conditioning system was reduced below the wet-bulb temperature of the air entering the apparatus. In accordance with Ray's invention, raw or atmospheric air was introduced into a heat exchanger. The air emerged from the heat exchanger and entered a first vestibule, at which point, part of the air, having a lower dry and wet-bulb temperature than it did upon entering the heat exchanger, can be drawn off or bled for cooling purposes. The remaining air leaving the first vestibule entered a washer or humidifier where the air had a tendency to further cool the water. Since the air was not saturated, the air could absorb water, and continue to abstract heat from the air by conventional water vaporization.

The air left the washer and entered a second vestibule where part of it could be bled off for use, if desired. The air in the second vestibule was more saturated and lower in temperature than the air in the first vestibule. If the air in the second vestibule was bled off, it was required to place eliminators between the washer and point of bleeding to remove the entrained moisture. The saturated and cold air leaving the vestibule, and not bled off for use, was again washed with a spray of water to insure a high degree of saturation. It was then forced through the heat exchanger where the heat for the evaporation process could be drawn from the entering warm air.

Whereas this invention was capable of cooling air to below the wet-bulb temperature of the raw air or atmospheric air entering the heat exchanger, it was quite complicated, complex, required extensive spraying apparatus and ductwork and was quite expensive and relatively inefficient. Also, the cooled air was usually very high in humidity since it was exposed directly to the water in the wash compartment. The thermal efficiency of this system was, therefore, not nearly as high as it should have been or could have been.

U.S. Pat. No. 2,174,060, to Niehart, discloses an improved air conditioning apparatus that provided a means and operated by a method which comprised reducing the temperature of incoming air towards its dew point temperature by employing a heat transfer through a partition which was dry on one side and wet on the other. The total initial volume of the incoming air was first passed over the dry surface, and then was divided into a stream which flowed into the room to be cooled. A second stream which was then passed into contact with the wet side of the partition so that the air that contacted the wet side of the partition had already been reduced in temperature by its movement from the dry side. When the air first came into contact with the wet surface, this surface was at or near the new wet-bulb temperature and by the action of the heat transmitted through the partition from the dry side and taken up by water and air current, the wet-bulb temperature of the air flowing over the wet side increased until it had absorbed the heat being transmitted through the partition. Accordingly, more heat was absorbed through the process of increasing the wet-bulb temperature on the wet side of the partition and little heat was lost by increasing the temperature of the water therein.

The apparatus disclosed by Niehart incorporated the return of cold air into the hot end of the heat exchanger thereby resulting in the injection of cold air into a hot ambient airstream. This caused a lowering of the temperature at the hot end of the heat exchanger and a consequential lowering of the temperature of the humid exhaust air. Unnecessary heat was gained by the system due to a cooler exhaust air than need be. In addition, the cooling capacity of this system was greatly reduced to a lower amount of water per unit of mass flow of air that could be absorbed by the cold air entering the atmosphere of the wet evaporating chamber.

U.S. Pat. No. 4,023,949, issued on May 17, 1977 to Leslie A. Schlom et al for an EVAPORATIVE REFRIGERATION SYSTEM. This patent disclosed a system wherein air is evaporatively cooled by water in which the evaporating water is kept separate from the useful air of the cooled airstream by means of a heat exchanger so that cooling is performed without the addition of water vapor to the useful air and in which the working air absorbing the water vapor is drawn from the load. A heat exchanger is disclosed which operates by movement of the working air internally through tubular conduits concurrently to water flowing downward on the inner surfaces thereof while the air to be cooled passes externally across the conduits.

Therefore, the incoming fresh air is in an air-to-air cross-flow heat exchanger configuration to the return air and the return air is in an air-to-water counter-flow heat exchange configuration in which the water flows in the opposite direction. The Schlom et al application teaches a heat exchanger with separate dry sides and wet sides with the evaporating water being kept separate from the useful air so that cooling is performed without the addition of water vapor to the useful air; and all of the working air is drawn from the load and recirculated from the enclosure to be cooled to the wet side of the heat exchanger. Schlom et al specifically states that the wet side of the heat exchanger operates by movement of the working air internally through conduits counter-currently or in a counter flow with the water flowing downwardly along the conduit tubes inner surfaces while the useful air passes through the dry side in cross-flow to the return air in the conduit. This patent specifically teaches that the obtained increases in efficiency are due to flowing the moisture-laden return air exhausted from the wet side of the heat exchanger in a cross-flow heat exchanger which includes a separated relationship between the fresh air flow upstream from the dry side of the heat exchanger. Since the evaporating water is kept totally separate from the cooling airstream by means of the heat exchanger so the cooling is performed without the addition of water vapor, sensible cooling is achieved. While this patent represents an increase in efficiency, it nonetheless discloses a relatively complex and complicated system requiring costly equipment which still does not maximize the efficiency possible or solve many of the basic problems in evaporative cooler systems.

U.S. Pat. No. 4,188,994, issued to Louis W. Hinshaw on Feb. 19, 1980 for a COOLING AND HEATING APPARATUS. The patent teaches a cooling apparatus having an evaporative cooler interfaced with insulated air chamber and detachable therefrom to be replaced with a solar heater collecting panel. The insulated air chamber is connected to a home or other structure by a passage means; and the evaporative cooler is operable by other than the conventional electrical energy source as well as the usual electrical energy source so that the assembly can be used for cooling and heating of houses and other structures.

Hinshaw claims to be the first to use a dry air interface to directly cool air in an evaporative cooler system. The system involves exhausting the evaporated moisture into the atmosphere rather than into the building to be cooled. A metal plate is disposed on one face of the evaporative cooler to serve as an interface between the evaporative cooler and the body of the insulative box and the solar panel portion has been detached. As the warm air flows into the system and its temperature drops, moisture will condense and run off of the baffles and back on the interface into the bottom of the chamber. This will cause the cooling system to de-humidify the air as well as to cool it.

The heat exchange method of this patent is relatively expensive an ineffective and the efficiency of this system is far from that of the present evaporative system.

Therefore, a long-felt need has existed and continues to exist for an improved evaporative cooler system capable of efficiently cooling air below the wet-bulb temperature of the supply air while remaining relatively simple in design, structure, fabrication techniques required, and energy used.

BRIEF SUMMARY OF THE INVENTION

It is an object of the present invention to economically cool the interior of an enclosure, such as a room.

It is another object of the present invention to provide a simple and efficient method of ventilating an enclosure.

It is still another object of the present invention to conserve heat and cooling energy during the ventilation of an enclosure.

It is yet another object of the present invention to provide an apparatus and method for heating the interior of an enclosure.

It is another object of the present invention to provide an intake air-to-return air counter-flow heat exchanger with the return air being cooled by water evaporation to become the heat sink which cools the intake air.

It is still a further object of the present invention to provide an evaporative cooling system wherein the evaporation process continues within the heat exchanger during the heat exchange operation.

It is yet a further object of the present invention to provide an improved evaporative cooler system.

It is still another object of the present invention to provide an improved evaporative cooler wherein the absorption of water is not at a constant "enthalpy" but at a constant relative "humidity".

It is yet a further object of the present invention to provide an improved evaporative cooler system which can absorb more water per pound of air and can achieve significantly better performance than conventional evaporative coolers.

It is yet another object of the present invention to provide an improved evaporative cooler wherein the evaporation process occurs with the addition of heat in a "reverse temperature profile" to that of conventional evaporative coolers with the addition of heat being provided by an air-to-air counter-flow heat exchange from the heat gained in cooling the air.

It is still another object of the present invention to provide a cooling system which results in the absorption of many times the water per unit of mass air than that of simple evaporative coolers, and wherein the exhausted air requires significantly more heat energy to evaporate the added water than can possibly be extracted in the same mass of intake air in conventional evaporative coolers.

It is yet a further object of the present invention to provide a cooling system which produces a significantly lower temperature of cold air than that possible from conventional evaporative coolers.

It is yet another object of this invention to provide an evaporative cooler system which operates with an air-to-air counter-flow heat exchanger to produce a "reverse temperature profile" in which unlike conventional air-to-water or water-to-air evaporation means where the air temperature decreases, rather than increases, with distance in the direction of the evaporating air flow.

It is still another object of the present invention to provide an improved and more efficient evaporative cooling system than was heretofor possible in the prior art while also avoiding substantially all of the problems of the prior art.

Accordingly, the present invention provides an improved evaporative cooling system wherein the inlet air flows through a supply chamber and into an enclosure while the return air flows from the enclosure through a return chamber into the atmosphere. Heat is transferred from the supply chamber to the return chamber and vise versa such that evaporative cooling in accordance with the present invention is usable to economically cool a room significantly below the wet-bulb temperature of the inlet air.

As a result, the improved evaporative cooler air conditioning system of the present invention is capable of cooling air to temperatures well-below the wet-bulb temperature of the ambient air and even to temperatures approaching the dew point temperature and with significantly less relative humidity within the temperature controlled space or enclosure than with any other known evaporative cooler.

The foregoing and other objects, features and advantages of the present invention will be more fully apparent from the following detailed description of the preferred embodiment of the invention, the claims, and the accompanying drawings which are briefly described hereinbelow.

BRIEF DESCRIPTION OF THE DRAWINGS

FIG. 4 is a schematic illustration of the counter-flow heat exchanger of the present invention;

FIG. 5 is a sectional side view of the air-to-air counter-flow heat exchanger of FIG. 4;

FIG. 6 illustrates a conventional evaporative cooling apparatus.

FIG. 7 illustrates, graphically, the normal temperature profile of conventional evaporative cooling apparatuses;

FIG. 8 illustrates Applicant's air-to-air, counter-flow, heat exchanger.

FIG. 9 illustrates, graphically, the reverse temperature profile of the innovative air-to-air, counter-flow, heat exchanger of the present invention.

DETAILED DESCRIPTION OF THE PREFERRED EMBODIMENT

Figure 1:
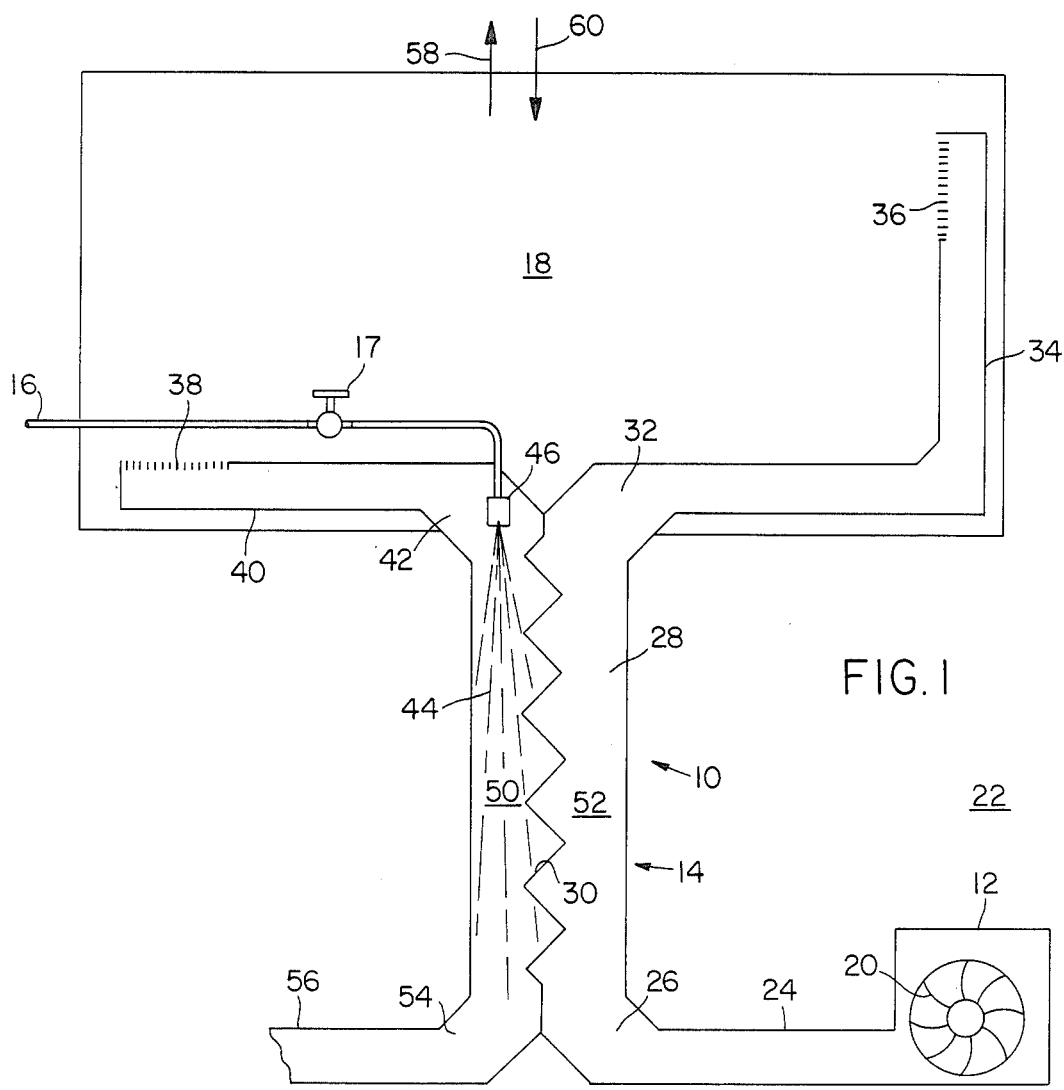
FIG. 1 is a plan view of the evaporative cooler air conditioning system of the present invention illustrating a counter-flow air-to-air heat exchanger.

FIG. 1 illustrates a cross-sectional diagram showing the preferred embodiment of the improved evaporative cooler system 10 of the present invention. The evaporative cooler system 10 includes a heat-exchanger portion 14 which has a supply chamber 52 physically separated from a return chamber 50 by a thermally conductive membrane 30. An air inlet port 26 of supply chamber 52 is connected to an air blower 12 through an entry duct 24.

The blower 12 includes a fan 20 that forces a flow of inlet supply air from the atmosphere 22 through supply inlet chamber 52. An outlet port 32 of the chamber 52 is connected to a supply duct 34. As explained hereinafter, the supply air is cooled in supply chamber 52 by heat transfer through the membrane 30 and the cooled supply air flows into the supply duct 34 from supply chamber 52. The supply duct 34 is connected to an enclosure or room 18 through a supply register 36. The cooled supply air passes through the register 36 and into the room or enclosure 18 thereby cooling the airspace within the room 18.

The room 18 is then connected to a return duct 40 through a return register 38. Preferably, the registers 36 and 38 have as large a spatial separation as physically practical within the particular room or enclosure 18 in which they are used.

Returned air from the room 18 flows into the return duct 40. Because of the spatial separation of the registers 36 and 38, and because of the heat load of the room 18, the temperature of the returned air is significantly higher than the temperature of the cooled air supply. From the explanation given hereinbefore, the first embodiment of the present invention relates to a system that is closed between the chamber 50 and 52.

The return duct 40 is connected to a return port 42 of return chamber 50. An exhaust port 54 at the opposite end of return chamber 50 is connected to the atmosphere 22 by an exhaust duct 56. Accordingly, the returned air that flows into return duct 40 also flows through the wet return chamber 50 and into the atmosphere 22. As explained hereinafter, the temperature of the returned air flowing past the membrane 30 is below the temperature of the supply air, thereby causing a transfer of heat from the air within chamber 52 to the air within chamber 50 via the membrane 30. This heat transfer causes a heating of the returned air and a cooling of the supply air.

A water evaporator 46 is disposed in any suitable manner within return chamber 50 near the port 42. The evaporator 46 is connected to a source of water, not shown, but known in the art, through a conventional pipe 16. The evaporator 46 may be a spray nozzle or any other device that causes that evaporation of water.

Water is forced through the water evaporator 46 into return chamber 50 as spray 44 wherein it is evaporated. The evaporation process substantially saturates the returned air with water vapor. Because of the evaporation, the temperature of the vapor-saturated returned air is significantly below the temperature of the inlet air on the opposite sides of the membrane 30.

From the explanation given hereinbefore, the supply air is cooled without being saturated with water vapor. Moreover, evaporation takes place as the heat transfer causes a heating of the returned air. The heating of the returned air increases the amount of water which can vaporize, thereby providing an increased heat absorption and cooling effect of the evaporation. This effect is greatly enhanced because the heat exchange occurs when supply air and return air move in opposite directions as in the air-to-air counter-flow heat exchanger of the present invention. Because of the increased heat absorption in the returned air, the cooled supply air may have a temperature significantly below the wet-bulb temperature of the inlet air.

In should be understood that the present invention utilizes evaporative cooling. Because of the evaporative cooling process, the apparatus in accordance with the present invention is inherently more simple, efficient, and more economical to operate than a cooling system which utilizes refrigeration. However, because supply air is cooled without the addition of water, the apparatus provides cooling comparable to that provided by a true refrigeration system.

In an alternate embodiment of the present invention, the blower 12 may alternately be disposed in either the duct 34, the duct 40, or the duct 56. Furthermore, as shown in the preferred embodiment, a valve 17 may be disposed within the pipe 16 so when cooling is not desired, the valve 17 can be operable to occlude pipe 16 and prevent evaporation. The returned air thereby warms or cools the supply air to conserve or preserve a desired temperature via the membrane 30. The supply air thereby ventilates the room 18.

Accordingly, the apparatus of the present invention is useful in ventilating an enclosure 18 and maintaining a desired temperature therein by recuperation of the heat in the returned air. A leakage of air from the room 18 is represented by an arrow 58 and the leakage of air into the room 18 is represented by an arrow 60. Either of the leakages reduces the cooling efficiency and the recuperation efficiencies of the apparatuses described hereinabove. A blower may be connected to the duct 56 or in duct 40 to force air therefrom and thereby equalize air pressure between the room 18 and the atmosphere 22 to substantially eliminate such leakage.

Figure 2:
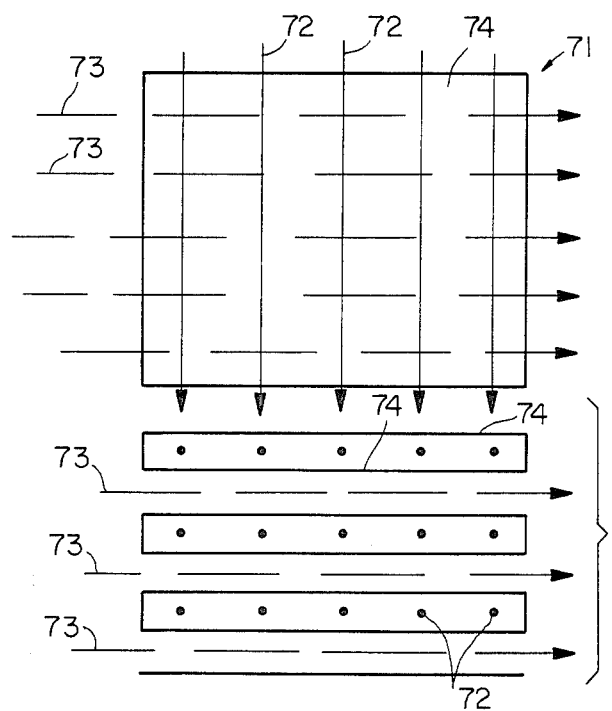
FIG. 2 is a schematic illustration of a cross-flow air-to-air heat exchanger of the prior art.
Figure 3:
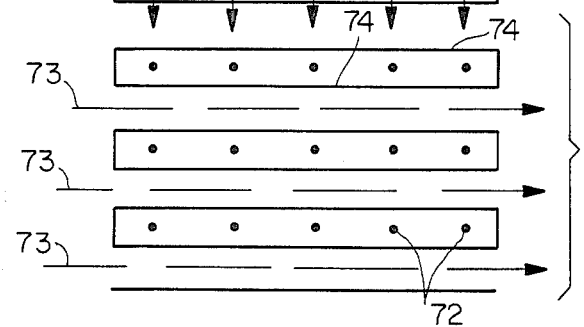
FIG. 3 is a sectional side view of the conventional cross-flow heat exchanger of FIG. 2.

FIG. 2 illustrates a conventional air-to-air cross-flow heat exchanger as indicated by reference numeral 71. A first fluid, such as the supply air, flows in the direction as indicated by the arrow 72, while a second fluid, such as the return air, is represented by the arrow 73. FIG. 3 is a cross-sectional end view of the air-to-air cross-flow heat exchange system 71 of FIG. 2 with the arrow 73 showing the direction of flow of the second fluid and the dots representing the arrows 72 to indicate the direction of flow of the first fluid. It will be noted that in both FIGS. 2 and 3, the air-to-air cross-flow configuration has the two airstreams flowing generally orthogonally or perpendicular to one another. It will of course, be recognized that individual heat exchange plates 74 of FIG. 3 may alternately be tubes or any conventional heat exchange material.

FIGS. 4 and 5 illustrate the air-to-air counter-flow heat exchanger technique of the present invention. FIG. 4 shows the direction of the first fluid, such as the supply air, as indicated by the arrow 76 and the direction of flow of the second fluid, such as the return air, indicated by the dashed arrow 77. It will be noted that rather than passing in orthogonal relationship to one another, the streams of air flow are parallel to one another and in opposite directions.

FIG. 5 shows a cross-sectional end view of the air-to-air counter-flow system 75 of FIG. 4 and shows that the first fluid such as the supply air is flowing in the direction of the arrow 76 while the return air is flowing in the opposite direction as indicated by reference arrow 77. The individual plates 74 of the heat exchanger of FIG. 5 could also be tubes or any conventional heat exchanger media known in the prior art. It will be observed that the counter-fluid technique of FIGS. 4 and 5 is quite different from the cross-flow technique of FIGS. 2 and 3. Each has a well-known established technical meaning within the heat exchange art and they are in no way equivalent, and they do not function in the same manner.

FIG. 6 illustrates a conventional evaporative cooling system 81; wherein, the inlet air is designated by the arrow 83; wherein, said inlet air passes through an evaporating medium 85; wherein, said evaporating medium 85 can be an aspen fiber pad or its equivalent; wherein, said inlet air 83 becomes cooled air that is represented by the arrows labeled by reference numeral 87 that exit the evaporation medium 85; and wherein, said cooled air 87 is much cooler than the inlet air 83.

FIG. 7 illustrates the temperature profile of the inlet air 83 as it becomes cooled air 87 within the evaporating medium 85 and shows that the inlet air temperature drops with distance as it moves through the evaporating medium 85. This is the "normal temperature profile" as generally taught in the prior art.

FIG. 8 illustrates the air-to-air counter-flow heat exchanger 91 of Applicant's invention. In FIG. 8, the atmospheric air represented by the arrow 92 enters entry duct 24 and passes through the heat exchange path in supply chamber 52 to exit through supply duct 34 into the room or enclosure 18 to be cooled as the inlet air represented by the arrow designated by reference numeral 93. Simultaneously, the return air indicated by the dashed arrow 94 enters through the outlet vent from the room through return duct 40 and into the second heat exchange path in return chamber 50 to exit to atmosphere via exhaust duct 56 as the exhaust represented by the dashed arrow 95. Supply chamber 52 and return chamber 50 are separated by a heat exchange membrane 30. Supply chamber 50 serves as the evaporation chamber and water is sprayed from a water inlet system 46 into that chamber as a fine mist or spray 44. As return air 94 from the enclosed space 18 is passed passes through the water evaporating return chamber 50 of the heat exchanger 91, it enters the water or mist 44 and becomes heavily saturated with that water sensible heat is absorbed by the latent heat of evaporation as this water saturated air is forced through return chamber 50, heat is drawn from the air being forced through supply chamber 52; where supply chamber 52 is on the opposite side of the membrane 30 and functions as a dry cooling chamber. In this manner, the air within return chamber 50 is heated and water is evaporated which results in the sensible cooling of the air forced through supply chamber 52 so that the air exiting the exhaust duct 56 is hot and very humid and the air exiting supply duct 34 is cool and dry.

The reverse temperature profile characteristic of Applicant's application, is illustrated in the graph of FIG. 9 which plots the air temperature against the distance in the direction of evaporative flow and shows a "reverse temperature profile" in which the air temperature increases with distance which is exactly opposite to the "normal temperature profile" of FIG. 5. Therefore, Applicant actually produces and uses the "reverse temperature profile" which is important to his invention; and this is totally contrary to the teachings of the normal temperature profiles associated with all known air-to-air heat exchangers using cross-flow techniques or conventional systems such as the evaporative cooling system 51 of FIG. 4 in which air temperatures drop or decrease with distance.

For a full understanding of the present invention, the distinctions illustrated with respect to FIGS. 2, 3, 4, and 5 must be understood since there is a basic thermodynamic difference between a cross-flow heat exchanger and counter-flow heat exchanger. The difference between these two types of heat exchangers is much more than the superficial fact of flow direction.

The heat transfer process in a cross-flow heat exchanger is highly non-linear. Temperature gradients across the heat exchange member are complex, and fluid temperature distributions are not simple. In a well-designed, counter-flow heat exchanger, the the equal mass flow rates, temperature gradient is relatively constant with distance, and fluid temperatures vary linearly. Because of these basic temperature characteristics and for a given amount of exchange membrane, cross-flow heat exchangers are no way near as effective as counter-flow heat exchangers. The potential linearity of counter-flow heat exchangers provides for the optimal use of the heat exchange materials.

However, in the case of the present invention, the most significant difference between the two archtypes of heat exchangers is not only the efficient of use of heat exchange materials, but it is in the differences in the basic thermodynamic processes themselves which occur within the exchanger.

Because of its geometry, a cross-flow heat exchanger has areas of very large temperature gradients across the heat exchange membrane and yet other areas a very small temperature gradients. When such an exchanger is used in conjunction with simultaneous evaporation, processes within certain areas are predominantly that of heat transfer, and yet other areas are predominantly that of evaporation. For significant portions of the cross-flow heat exchanger, evaporation and heat exchange are effectively separated. Evaporation within a cross-flow heat exchanger is little more effective than that of a separate evaporator with heat exchanger. Additionally, the high transfer rates of some areas necessitate liberal irrigation of the evaporative surfaces and this liberal irrigation mitigates against the very process which lies at the base of Applicant's invention.

The present invention teaches the use of a heat exchanger as a means of maximizing the cooling effect of water evaporation in the air by extending the evaporative process in the air flow as that air flow is caused to rise in temperature in the wet heat exchanger chamber to within a few degrees of ambient dry-bulb temperature. The present invention teaches that the evaporating air temperature rises during evaporation rather than the temperature falling during evaporation as occurs with all known prior art devices, since hot air absorbs more moisture and sensible heat than cold air. Therefore, the present application teaches a reverse temperature profile along the entire path of evaporation and such a reverse temperature profile can only be effectively achieved in a counter-flow heat exchanger.

As seen in FIGS. 2-4, the rise in temperature in return air is used to enhance the evaporation process and, via the heat exchanger, the cooling effect of evaporation of the supply air. The difference in temperature profiles is clearly illustrated in FIGS. 7 and 9.

Although it is theoretically possible that the process taught by the prior art can minutely occur in certain minuscule regions of a cross-flow heat exchanger, other areas of the exchanger will have quite the opposite effect. Over all, therefore, a cross-flow heat exchanger is quite ineffective and non-linear, and any reverse temperature profile is purely incidental and not deliberate and none has been recognized by any specific teaching in the prior art known to the present inventor.

Broadly, therefore, Applicant teaches the first known use of an air-to-air counter-flow heat exchanger in conjunction with the simultaneous evaporation of water to achieve a reverse temperature profile to that normally experienced in evaporation systems so as to maximize the cooling potential of water evaporation in air.

With this detailed description of the specific apparatus and method used to illustrate the present invention and the operation thereof, it will obvious to those skilled in the art that various modifications can be made in the construction, design and materials thereof and in the method contemplated thereby without departing from the spirit and scope of the present invention which is limited only by the appended claims.

I claim:

1. A method of cooling an enclosed space comprising the steps of:
    supplying ambient air from the atmosphere;
    cooling the ambient air at a constant humidity in an air-to-air counter-flow heat exchanger configuration;
    directing the cooled supply air from the heat exchanger to the enclosed space to be cooled;
    withdrawing return air from the enclosed space;
    adding moisture to the return air evaporating the moisture in a reverse temperature profile; and
    simultaneously heating the return air with the heat extracted from the supply air in the heat exchanger while increasing the specific humidity of the return air by increasing its ability to absorb the evaporated liquid, thereby enabling an even greater reduction in the temperature of the supply air by increased heat exchange between the supply air and the return air exhausting the relatively warm, humid return air to the atmosphere.

2. A system for maintaining a desired temperature in the interior of an enclosure, comprising:
    an air supply means including a supply chamber means for cooling the incoming ambient air at a constant specific humidity; said air supply means further including a supply air inlet means operatively communicating ambient atmospheric air to said supply chamber means;
    supply air inlet means for operatively communicating the cooled supply air from said supply chamber means into said enclosure interior;
    an air return means including a return chamber means for processing the return air at an increasing temperature and at an increasing specific humidity; and further including means for supplying return air from said enclosure interior to said return chamber means; and means for exhausting the relatively hot, moist return air from said return chamber means to atmosphere;
    means operably disposed proximate said return chamber means for operatively providing evaporative cooling of the return air and for simultaneously increasing its specific humidity and its ability to absorb additional heat;
    heat transfer means for substantially dividing the supply chamber means and return chamber means into separate and adjacent parallel paths oriented in an air-to-air counter-flow configuration, said heat transfer means including a heat exchange medium operatively separating the counter-flow paths of said supply chamber means and said return chamber means, and for transferring heat from the supply air in said supply chamber means to the evaporatively cooled return air in the return chamber means for greater cooling efficiency; said heat transfer means being operable simultaneously with said evaporative cooling means for simultaneously heating the return air in said return chamber means during the evaporation process so that the temperature of the return air is increased for permitting the return air to absorb even greater amounts of humidity in a reversed temperature profile, thereby enabling the supply air on the opposite side of said heat exchange medium to be cooled significantly below the wet bulb temperature and to approximately its dew point temperature; and means for maintaining a flow of supply air from the atmosphere through said air inlet means, said supply chamber, said supply air air inlet means and to the interior of said enclosure for cooling same, and for moving return air from said enclosed interior, through said return chamber and out said exhaust means into the atmosphere.

3. The system of claim 2 wherein said heat exchange medium includes a thermally conductive membrane which physically separates said supply chamber means and said return chamber means from each other.

4. An evaporative cooler system for maintaining a desired temperature in the interior of an enclosure, said enclosure having an enclosure inlet and an enclosure outlet, said system comprising:

an air inlet means for supplying atmospheric supply air;

a supply chamber operatively coupled to said air inlet means for operatively supplying atmospheric air through said supply chamber to said enclosure inlet and into said enclosure interior;

an exhaust vent means for supplying return air to the atmosphere;

a return chamber operatively coupled to said exhaust vent means through said return chamber to vent said return air to atmosphere;

heat transfer means including a thermally conductive membrane means for physically separating said supply chamber from said return chamber for forming separate parallel paths for forming an air-to-air counter-flow heat exchanger and for transferring heat from the supply air within said supply chamber to the return air within said return chamber;

moisturizing means for providing the operative cooling of the return air within the return chamber and for increasing the humidity of the return air thereby increasing its ability to absorb still more heat from the supply air within said supply chamber of further heating said return air and further increasing its ability to take on moisture by absorbing still more heat from the supply air within said supply chamber such that the temperature versus distance through the evaporative cooling return chamber presents a first temperature profile within said return chamber wherein said heat transfer means transfers significantly more heat from the supply air being cooled within said supply chamber to the moisturized return air being heated in said return chamber; and means for forcing a flow of supply air from the atmosphere through said air inlet means, through said supply chamber, and through said enclosure inlet into the interior of said enclosure for cooling same and for causing a flow of return air from said enclosure interior through said exhaust vent means into the atmosphere, the path being substantially closed between said supply chamber and said return chamber by said thermally conductive membrane means for separating said supply chamber from said return chamber to form an air-to-air counter-flow heat exchanger while serving as the heat exchange medium therefore.

5. The system of claim 4 wherein said moisturizing means includes nozzle means operatively coupled to a source of water for spraying water into and throughout said return chamber.

6. The system of claim 4 wherein said means for forcing further comprises:

an entry duct operatively coupled to said supply chamber; and an inlet blower means operatively coupled proximate said entry duct for forcing air from the atmosphere through said entry duct and through said supply chamber to said enclosure inlet and into the interior of said enclosure.

7. The system of claim 6 wherein said means for forcing additionally comprises:

an exhaust duct operatively coupled between said return chamber and said exhaust vent means; and an exhaust blower means operatively coupled proximate said exhaust duct for forcing return air from said enclosure outlet, through said return chamber, through said exhaust duct and out of said exhaust vent means to atmosphere.

8. The system of claim 4 wherein said means for forcing includes at least one blower means operatively coupled in the air flow at least one of between said air inlet means and said enclosure inlet and between said enclosure outlet and said exhaust vent means.

9. The system of claim 8 wherein said at least one blower means includes one blower means operatively disposed in the air flow path between said air inlet means and said enclosure inlet and a second blower means operatively disposed in the air flow path between said enclosure outlet and said exhaust vent means.

10. A method for evaporatively cooling the interior of an enclosure, comprising the steps of:

providing an air supply path between a source of ambient atmosphere and said enclosure interior and a return air path between the enclosure interior and the atmosphere;

moving a mass flow of supply air from the ambient atmosphere into said enclosure interior via said supply path;

aligning at least a portion of the supply path in parallel with at least a portion of the return path;

separating the supply path from the return path by a heat exchange medium;

directing the mass air flow through said supply and return paths in a counter-flow configuration;

moving a mass flow of return air from said enclosure interior to the atmosphere via said return path;

evaporating water with said return air in said return path for providing evaporative cooling therein; and transferring heat from the supply path to the return path through said heat exchange medium to operate the return path in a reverse temperature profile by simultaneously continuing to raise the temperature of the return air with the heat transferred from the supply air while simultaneously increasing the ability of the return air to absorb ever greater quantities of moisture, thereby enabling the supply air to be even further cooled to a temperature significantly below the wet bulb temperature and even to approximately the dew point temperature.

11. In a system for maintaining a desired temperature in the interior of an enclosure and including a supply chamber for supplying ambient air from the atmosphere to the enclosure interior to be cooled, a return chamber for returning the stale air from the enclosure interior to the atmosphere, an improved method of cooling comprising the steps of:

supplying atmospheric air through the supply chamber to the interior of the enclosure to be cooled;

moving used return air out of the interior of the enclosure to be cooled for return to the atmosphere through the return chamber;

aligning the supply chamber with the return chamber so that they are approximately parallel and adjacent to one another;

directing the supply of atmospheric air through the supply chamber in a first direction and moving the return air through the return chamber in a direction opposite to said first direction to establish an air-to-air counter-flow heat exchange therethrough;

separating the supply chamber from the return chamber by a thermally conductive heat exchange medium;

evaporating a liquid in the return chamber for providing evaporative cooling in the return air; and transferring heat from the incoming atmospheric air in the supply chamber to the return air in the return chamber for heating the return air performing the evaporation with increased specific humidity and temperature by continually adding heat drawn from the supply chamber to continually increase the capacity of the return air to absorb the evaporated liquid and therefore the ability to absorb still additional heat while cooling the supply air in the supply chamber at a constant relative humidity to cool the interior of the enclosure more efficiently and to a lower temperature than with conventional evaporative coolers.

12. The improved method of claim 11 further comprising the step of continuing to evaporate a liquid in the return chamber while continually increasing the return air temperature and the specific humidity of the return air; and cooling the supply air prior to its leaving the supply chamber to significantly below the wet bulb temperature and possible as low as the dew point temperature without the use of refrigerated water of the like.

13. A modified evaporative cooling system for maintaining a desired temperature in an enclosed space comprising:

a cooling chamber means for cooling ambient air at a relative constant humidity without the addition of moisture to or evaporation in the cooling chamber means, thereby producing relatively cool dry supply air for cooling said enclosed space;

means for supplying ambient atmospheric air to said cooling chamber means;

means for communicating said relatively cool dry supply air from said cooling chamber means to said enclosed space to be cooled;

an evaporation chamber means including an evaporative cooling means for evaporating a liquid into the evaporation chamber means;

means for supplying return air from said enclosed space to said evaporative cooling means;

heat exchange means including means for operatively coupling said cooling chamber means and said evaporative chamber means in a heat exchange configuration, said heat exchange means including a heat exchange medium operatively separating said cooling chamber means from said evaporation chamber means for heat exchange purposes;

said evaporative chamber means and said heat exchange means transferring heat extracted from the supply air in said cooling chamber means for increasing the temperature of the return air in the evaporative chamber means while simultaneously increasing its specific humidity, said evaporative chamber means for simultaneously heating said return air while adding moisture thereto in a reverse temperature profile to greatly decrease the temperature of said supply air substantially below the wet bulb temperature and to approximately the dew point temperature for further and more efficient cooling of said enclosed space; and means for exhausting the relatively hot, moisture-laden return air from said evaporative chamber means to the atmosphere.

14. The modified evaporative cooling system of claim 13 further including means operatively disposed in at least one of said means for supplying ambient atmosphere air to said cooling chamber means, means for communicating said relatively cool dry supply air from said cooling chamber means to said enclosed space, means for supplying return air from said enclosed space to said evaporative chamber means, and said means for exhausting the return air to the atmosphere for maintaining mass air flow movement throughout the system.

15. The modified evaporative cooling system of claim 14 wherein said enclosed space is subject to some leakage and said system further includes means for moving the mass air flow from the atmosphere to said enclosed space operably disposed in at least one of said means for supplying ambient atmospheric air to said cooling chamber means and means for communicating supply air from said cooling chamber means to said enclosed space; and additional means for moving the return air from said enclosed space to the atmosphere operably disposed in at least one of said means for supplying return air from said enclosed space to said evaporative chamber means and said means for exhausting the return air from said evaporative chamber means to the atmosphere.

16. A cooling system for maintaining a desired temperature in an enclosed space comprising:

an air-to-air counter-flow heat exchange means including a cooling chamber, an evaporating chamber operatively disposed adjacent to said cooling chamber, a heat exchange means operatively separating said cooling chamber and said evaporating chamber in a heat exchange configuration;

means for supplying ambient air to said cooling chamber, said heat exchange means cooling said ambient air to be supplied to said enclosed space at a constant humidity without evaporation or contact with moisture, said cooling being sufficient to lower the temperature of the supply air substantially below the wet bulb temperature and approximately equal to the dew point temperature;

means for supplying relatively cool dry supply air to said enclosed space for cooling same;

means for supplying the used air to be returned from said enclosed space to said evaporating chamber;

said evaporating chamber including means for introducing moisture into the return air stream for evaporating same for cooling purposes;

said evaporating chamber drawing heat from said supply air in said cooling chamber via said heat exchange means for simultaneously increasing both the temperature and the absolute humidity of the return air in the evaporating chamber in a reverse temperature profile, thereby decreasing the temperature of the supply air in the cooling chamber significantly below the temperature possible with evaporative cooling alone and increasing the efficiency of the cooling system; and means for exhausting the relatively hot, moisture-laden return air to the atmosphere.

17. The system of claim 16 further including means for moving at least one of the supply air mass and the return air mass operatively disposed in at least one of said supply means and said exhausting means.

18. An improved evaporative cooling system capable of cooling supply air for maintaining the temperature in an enclosed space substantially below previously attained temperatures, the system comprising:

a dry cooling chamber having an air inlet communicating with the atmosphere for receiving ambient atmospheric air, an inlet into the interior of the enclosure to be cooled for providing supply air thereto, said dry cooling chamber including an intermediate dry cooling chamber portion having an input and an output;

a wet evaporation chamber having an outlet vent from the interior of the enclosure to be cooled and an exhaust outlet supplying return air from the wet evaporation chamber to the atmosphere, said wet evaporation chamber including an intermediate wet evaporation chamber portion having an input and an output;

heat exchange means operatively separating said dry cooling chamber portion from said wet evaporating chamber portion for forming a counter-flow heat exchanger;

means for drawing atmospheric air into said air inlet, through said dry cooling chamber including said intermediate counter-flow heat exchange portion, into the interior of said enclosure via said enclosure inlet, through said enclosure interior and out said outlet vent, throught said wet evaporative cooler including said intermediate counter-flow heat exchange portion, and out said exhaust outlet to the atmosphere, substantially an equal volume of air being drawn in through said air inlet as being exhausted through said exhaust outlet;

means for saturating the return air with a liquid within said wet evaporation chamber and evaporating said liquid with said return air and heat drawn through said heat exchange means from the supply air in said dry cooling chamber;

the counter-flow of said supply air in said intermediate portion of said dry cooling chamber and the return air in the intermediate portion of said wet evaporative chamber enabling said heat exchange means to draw additional heat from the supply air for pre-cooling the return air substantially below the wet bulb temperature of the ambient air before it is saturated with water, thereby cooling the supply air to a temperature as low as the dew point temperature, the operation of the heat drawn from the supply air to the return air and the evaporation process resulting in a reverse temperature profile whereby both the temperature of the return air and the relative humidity thereof are simultaneously increasing within the wet evaporation chamber concurrent with the evaporative cooling process for enabling additional moisture to be evaporated and absorbed by the return air, and therefore additional cooling of the supply air for greater cooling and greater cooling efficiency within the enclosed space.

19. A modified evaporative cooling system utilizing a reverse temperature profile to achieve greater cooling in an enclosed space whose temperature is to be controlled comprising:

a supply air passage operatively communicating ambient air from the atmosphere to an enclosed space to be cooled, said supply air passage including a supply air inlet means operatively communicating with the atmosphere and a supply air outlet means for supplying cool supply air to said enclosed space to be cooled;

a return air passage operatively communicating return air from the enclosed space to be cooled, said return air passage including a return air inlet means communicating said enclosed space with said return air passage, and a return exhaust means operatively communicating said return air passage to the atmosphere for returning the relatively hot, moisture-laden return air thereto;

means operably disposed within at least one portion of said air passages for moving the air mass from the atmosphere through the supply air passage and the return air passage;

an air-to-air counter-flow heat exchange means, said supply air passage including an intermediate dry cooling chamber interposed between said supply air inlet means and said supply air outlet means, said return air passage including a wet evaporating chamber interposed between said return air inlet means and said return exhaust means, said heat exchange means including means for operatively disposing said intermediate dry cooling chamber adjacent to and in a counter-flow arrangement with said intermediate wet evaporating chamber and a heat exchange medium operably disposed for separating the said chambers to create a heat exchanger therebetween for cooling the ambient supply air in said intermediate dry cooling chamber at a constant specific humidity by conducting heat from the supply air within the intermediate dry cooling chamber to the return air within the intermediate wet evaporating chamber; and means for moisturizing said intermediate wet evaporating chamber such that the moisture is evaporated by the return air from the enclosed space for increasing the humidity of the return air while the heat absorbed from the supply air in the intermediate dry cooling chamber increases the temperature of the return air simultaneously, thereby allowing the return air to absorb substantial additional moisture such that he relatively warmer return air with its increased content of absorbed water is exhausted to the atmosphere via said return exhaust means while enabling the heat exchanger to cool the supply air to a temperature significantly below the wet bulb temperature and approximately as low as the dew point temperature.

20. In a cooling system having an enclosed space to be cooled, a dry cooling chamber, and a wet evaporating chamber, the improved method of evaporatively cooling the enclosed space comprising the steps of:

separating at least a portion of said chambers with a heat exchange medium;
arranging the dry cooling chamber and the wet evaporating chamber in a counter-flow heat exchange configuration;
moving a quantity of ambient air from the atmosphere into the dry cooling chamber;
moving the substantially heat quantity of return air from the enclosed space to be cooled into the wet evaporating chamber;
moisturizing the return air with a liquid;
evaporating the liquid with the return air while simultaneously extracting heat from the supply air to raise the temperature of the return air to increase its ability to absorb moisture from the evaporated liquid;
further cooling the ambient supply air at a constant specific humidity to a temperature significantly below the wet bulb temperature of the ambient air and approaching the dew point temperature of the ambient air for more efficiently cooing the enclosed space while simultaneously transferring additional heat through the heat exchange means to the return air to further increase its temperature and specific humidity; and
exhausting the relatively hot, moisture-laden return air to the atmosphere.

21. A method of evaporatively cooling an enclosed space to a lower temperature than previously possible comprising the steps of:
providing a supply air cooling chamber and a return air evaporating chamber;
configuring the supply air cooling chamber and the return air evaporating chamber in a counter-flow arrangement between an enclosed space to be cooled and the atmosphere;
supplying ambient air from the atmosphere into the supply air cooling chamber;
cooling the supply air within the supply air cooling chamber by extracting heat for transfer to the return air in the evaporating chamber;
lowering the temperature of the supply air in the cooling chamber at a constant humidity;
supplying the cool dry supply air from the cooling chamber to the enclosed space for cooling same;
moving return air from the enclosed space into the evaporating chamber;
moisturizing the return air within the evaporating chamber with a liquid for evaporative cooling purposes;
evaporating the liquid with said return air in said evaporating chamber while simultaneously heating the return air in a reverse temperature profile with heat extracted from the supply air while increasing the specific humidity of the supply air to permit significantly lower cooling of the supply air while increasing the ability of the return air to absorb the evaporated liquid; and
exhausting the relatively warm, humid return air to the atmosphere.

22. A system for maintaining a desired temperature in the interior of an enclosure comprising:
air supply means including a supply chamber, intake means operatively coupling ambient atmosphere to said supply chamber, and supply outlet means operatively coupling said supply chamber to said enclosure, said intake means, said supply chamber and said supply outlet means defining a path for the movement of intake air from the atmosphere, through said supply chamber, and through said supply outlet means to supply air to the interior of said enclosure;
air return means including a return chamber, a return inlet means operatively coupling said enclosure to said return chamber, and an exhaust means for operatively coupling said return chamber to the atmosphere, said return inlet means, said return chamber, and said exhaust means defining a path for the movement of return air from the interior of said enclosure, through said return chamber and out said exhaust means for returning exhaust air to the atmosphere, said exhaust means being operably disposed with respect to said supply intake means for minimizing the ingestion of exhaust air into the intake air;
air-forcing means for moving said intake air through said defined paths to said exhaust means;
heat transfer means for conducting heat from said intake air within said supply chamber to return air within said return chamber; said heat transfer means, said supply chamber and said return chamber combining to form a counter-flow heat-exchange means wherein said supply air moves substantially parallel with and counter-current to the movement of said return air for cooling the supply air by conducting heat therefrom to said return air for raising the temperature of said return air; and
liquid evaporation means operably disposed at least partially within said return chamber for the absorption of heat by the latent heat of evaporation, the liquid evaporation being substantially continuous during the conduction of heat by said heat transfer means for increasing both the specific humidity and the temperature of the return air as it moves through said return chamber to provide a greater cooling capacity in the supply air than would be possible with evaporative cooling alone due to the reverse temperature profile of increasing temperature with increasing liquid evaporation in the return air.

* * * * *